(12) United States Patent
Mack

(10) Patent No.: US 7,854,997 B2
(45) Date of Patent: Dec. 21, 2010

(54) ADHERENDS WITH ENHANCED SURFACES

(75) Inventor: Julia J. Mack, Encino, CA (US)

(73) Assignee: The Boeing Company, Chicago, IL (US)

( * ) Notice: Subject to any disclaimer, the term of this patent is extended or adjusted under 35 U.S.C. 154(b) by 861 days.

(21) Appl. No.: 11/680,419

(22) Filed: Feb. 28, 2007

(65) Prior Publication Data

US 2008/0206591 A1 Aug. 28, 2008

(51) Int. Cl.
*B32B 5/00* (2006.01)
*B32B 15/04* (2006.01)
*B32B 15/08* (2006.01)
*B32B 15/20* (2006.01)

(52) U.S. Cl. ............... 428/650; 428/626; 428/457; 428/678; 428/680; 428/220; 428/332; 428/343; 977/810

(58) Field of Classification Search ............ 428/650, 428/652, 678, 680, 674, 670, 672, 673, 646, 428/220, 332, 343, 344, 353, 626, 457
See application file for complete search history.

(56) References Cited

U.S. PATENT DOCUMENTS 4,539,041 A 9/1985 Figlarz et al.

2006/0159603 A1 7/2006 Vanheusden et al.
2008/0314284 A1 * 12/2008 Li et al. ............... 106/31.9

FOREIGN PATENT DOCUMENTS

WO WO 97/17144 * 5/1997
WO PCT/US2008/055251 2/2008

OTHER PUBLICATIONS

Diane Ung et al., CoNi Nanowires Synthesized by Heterogeneous Nucleation in Liquid Polyol, Advanced Materials, vol. 17, No. 3, Feb. 10, 2005, pp. 338-344.

* cited by examiner

*Primary Examiner*—Michael La Villa
(74) *Attorney, Agent, or Firm*—Tung & Associates

(57) ABSTRACT

Metallic substrates have a surface for receiving application of an adhesive that includes a precipitated coating of metallic nanoparticulates. A first portion of the nanoparticulates is adhered to the surface and a second portion is in contact with the first portion. Also provided are adhered constructs. These constructs include a first substrate with a first surface that has a metallic precipitated coating of nanoparticulates. A first portion of the nanoparticulates is adhered to the surface and a second portion contacts the first portion. The constructs include a second substrate that has a second surface; and an adhesive is applied between the first surface and the second surface.

9 Claims, 4 Drawing Sheets

ADHERENDS WITH ENHANCED SURFACES

TECHNICAL FIELD

The embodiments described herein generally relate to adherends with enhanced surfaces, and more particularly relates to metallic adherends with nanoparticulate-enhanced surfaces that promote adhesion.

BACKGROUND

In manufacturing processes it is frequently necessary to join together two or more substrates, for example two metal panels, or a metal panel to a plastic ("organic polymeric") panel. While these may be joined with a variety of fasteners, or by welding or soldering, it is increasingly common to use an adhesive instead. The automobile and aerospace industries use high strength adhesives to form strong, long lasting bonds between substrates. Adhesives avoid the potential heat treatment of metals that can occur during welding, and also avoid any puncturing, and thus weakening, of the substrates that may be required when fasteners are used. Adhesive application can be readily controlled in automated manufacturing processes. Adhesives can be used to join a variety of components together. The use of adhesives also allows two component parts to be separated and a replacement for one component to be joined to the other with another application of an adhesive.

The strength of an adhesive bond between adhered substrates depends upon a variety of factors, including the strength of the bond between the adhesive and each substrate. This adhesive-substrate bond strength in turn depends upon several factors that include the condition and configuration of the substrate's surface when the adhesive is applied. Generally, at least some surface preparation treatments are carried out to prepare surfaces for receiving an adhesive. These might include cleaning off loose debris and degreasing. Of course, the larger the surface area that is bonded, the stronger the bond. Surface enlargement may be achieved by forming grooves or other irregularities on the surface. But, in some instances, such modifications may mechanically weaken or alter the substrate. Accordingly, such surface enhancement may not always be feasible or desirable.

Further, the longevity of an adhesive bond also depends on a variety of factors to which include the conditions it may be exposed to in ordinary use. For example, in the case of two metal panels adhered together, if one panel is subjected to higher temperatures than the other, it might be expected to expand thermally relative to the adhesive because plastic adhesives have low coefficients of thermal expansion relative to metals. Further, since adhesives are not good conductors of heat, the adhesive will conduct little heat to the other panel. This thermal expansion of one panel relative to the adhesive and to the other panel imposes heat-induced stresses on the adhesive bond. If the temperature of the one panel tends to cycle, the repeated cyclical heat-induced stresses may cause delamination.

Accordingly, it is desirable to provide adherends with enhanced surfaces for receiving an adhesive to produce stronger adhesive bonds. In addition, it is desirable to improve thermal conductivity between two substrates that are bonded together so that differential thermal expansion effects and the resultant tendency to delaminate are reduced Furthermore, other desirable features and characteristics of the enhanced adherend surfaces will become apparent from the subsequent detailed description and the appended claims, taken in conjunction with the accompanying drawings and the foregoing technical field and background.

BRIEF SUMMARY

Exemplary embodiments include metallic substrates that have a precipitated coating on a surface for receiving application of an adhesive. The precipitated coating includes metal nanoparticulates. A first portion of the nanoparticulates is adhered to the surface for receiving the adhesive, and a second portion of the nanoparticulates is in contact with the first portion.

Another exemplary embodiment provides adhered constructs. The constructs include a first substrate with a first surface that has been modified with a precipitated coating of metallic nanoparticulates. A first portion of the nanoparticulates is adhered to the surface and a second portion of nanoparticulates is in contact with the first portion. The construct includes a second substrate that has a second surface; and an adhesive is applied between the first surface and the second surface.

Another exemplary embodiment provides methods of enhancing a surface of a substrate that include pre-treating the surface of the substrate, immersing the surface in a reaction precursor solution, and precipitating metallic nanoparticulates from the solution to grow onto and bond with a portion of the immersed surface.

BRIEF DESCRIPTION OF THE DRAWINGS

Various embodiments will hereinafter be described in conjunction with the following drawing figures, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

Figure 1:
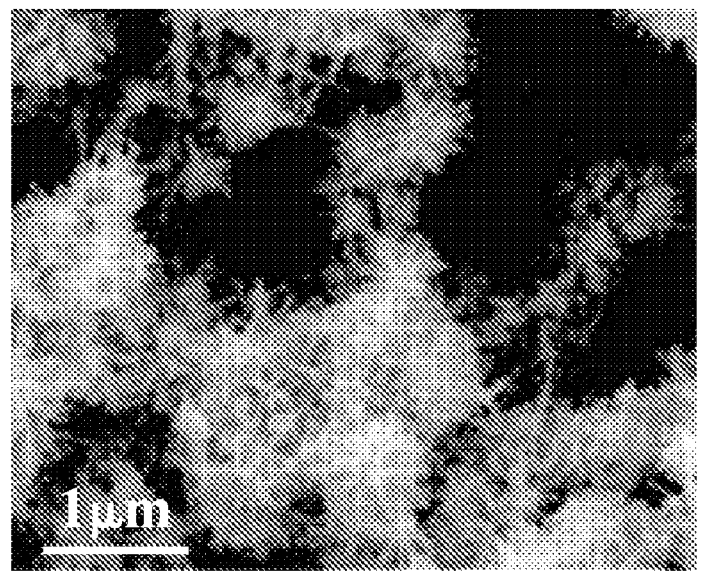
FIG. 1 is a photomicrograph (including marked scale) of an exemplary embodiment of CoNi alloy nanoparticulates.
Figure 2:
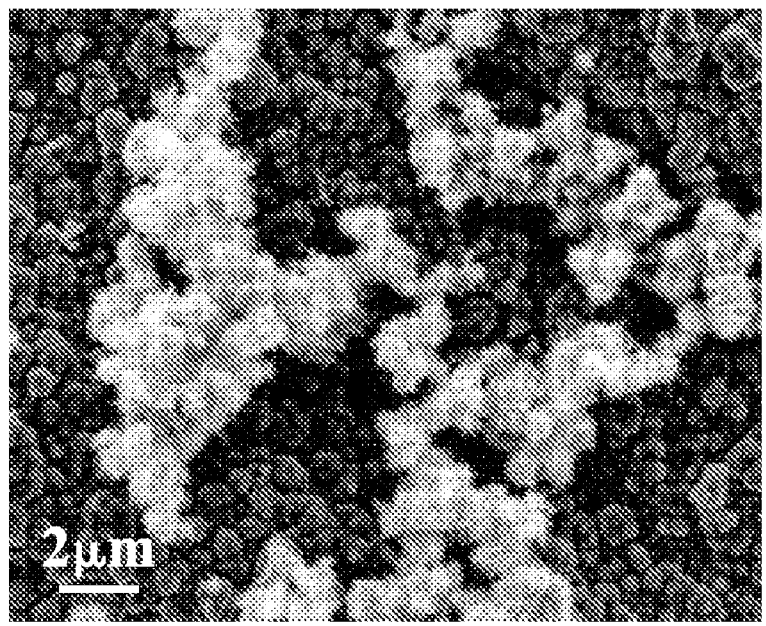
FIG. 2 is a photomicrograph (including marked scale) of an exemplary embodiment of CoNi alloy nanoparticulates.

An exemplary embodiment provides adherends that have an enhanced surface for receiving an adhesive. The enhanced surface includes a continuous or discontinuous precipitated coating or layer of metallic nanoparticulates. In the specification and claims, the term "precipitated coating" refers to a coating formed by precipitation of metallic nanoparticulates onto a surface so that some nanoparticulates bond to the surface while others that are not bonded the surface are in contact with the nanoparticulates that are bonded to the surface. The precipitated coatings may be continuous or discontinuous with some portions of the substrate surface area not covered by bonded nanoparticulates. The nanoparticulates may occur in any of a variety of shapes, for example starburst, rod, spherical, cylindrical, etc. Starburst nanoparticulates, for example, are shown in FIG. 1 and FIG. 2. Depending upon the nature of the nanoparticulate and process variables during production, as explained below, the nanoparticulates may be tailored for size and shape. In general, the nanoparticulates are in the size range from about 50 nm to about 1.0 micron, more typically in the range from about 150 nm to about 750 nm.

Figure 3:
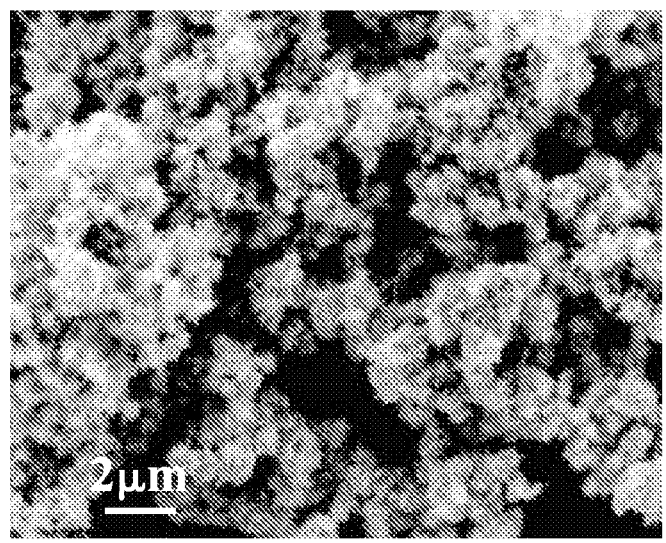
FIG. 3 is a photomicrograph (including marked scale) of an exemplary embodiment of CoNi alloy nanoparticulates.
Figure 4:
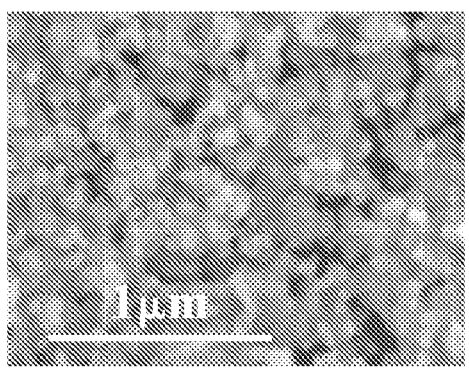
FIG. 4 is a photomicrograph (including marked scale) of an exemplary embodiment of CoNi alloy nanoparticulates.
Figure 5:
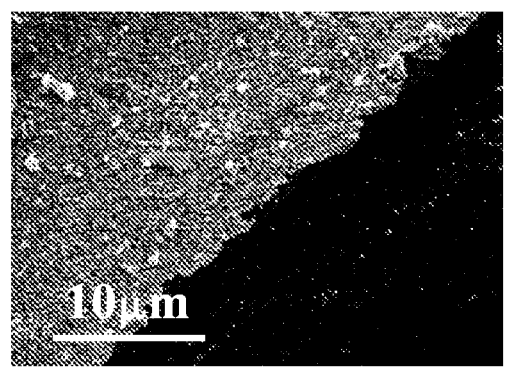
FIG. 5 is a photomicrograph (including marked scale) of an exemplary embodiment of CoNi alloy nanoparticulates.

Some nanoparticulates closest to the surface may be chemically bound by covalent or ionic bonds or van de Waal's forces to the surface and are therefore "adhered" to the surface. Other nanoparticulates may be in contact with the covalently-bound nanoparticulates and multiples of these form clusters. In the exemplary embodiments of FIG. 3 and FIG. 4, the nanoparticulates may be present in clusters that extend in every direction and that form networks of clusters on the surface. As shown in the example of FIG. 4, the nanoparticulate clusters may be dense when seen at high magnification, and yet dispersed on the surface, as shown in FIG. 5.

The nanoparticulates include at least one precipitated metal, or a precipitate that includes two or more metals in a metal alloy. Being metallic, the nanoparticulates are thermally more conductive than an organic polymeric adhesive. In general, as explained in more detail below, the precipitated metallic nanoparticulates may include any of those metals that (1) form salts that are soluble in non-aqueous (for example, polyol and the like) and (2) that may be precipitated from these solutions as metallic precipitates. A non-limiting list of suitable metal salts for the non-aqueous solvent includes acetates, nitrates, sulfates, halides, carbonates, phosphates, and carboxylates.

The selection of salt and solvent may depend upon the nature of the surface to be enhanced with nanoparticulates and/or the nature and conditions of the environment in which the adhesive-bonded product will be used. In addition, if it is desired that the nanoparticulates enhance thermal conductivity, the metal should be selected, and process parameters adjusted, such that the precipitated metal forms clusters. When the cluster-enhanced surface is bonded to another surface, the clusters may extend to form a bridge to carry heat from the enhanced surface to another surface bonded to it. Accordingly, appropriate selection of salt, solvent and process parameters permits tailoring of the enhanced surfaces for particular conditions, properties and uses.

The metal compounds that may be used include all metal compounds that a polyol can reduce to the corresponding metal (oxidation state=O). Non-limiting examples of such metals include main group metals such as, e.g., lead, tin, antimony and indium, and transition metals such as, e.g., gold, silver, copper, nickel, cobalt, palladium, platinum, iridium, osmium, rhodium, ruthenium, rhenium, vanadium, chromium, manganese, niobium, molybdenum, tungsten, tantalum, iron and cadmium. Examples of preferred metals include gold, silver, copper and nickel, in particular, silver, copper, cobalt and nickel.

Non-limiting examples of suitable metal compounds include metal oxides, metal hydroxides (including hydrated oxides), metal salts of inorganic and organic acids such as, e.g., nitrates, nitrites, sulfates, halides (e.g., fluorides, chlorides, bromides and iodides), carbonates, phosphates, azides, borates (including fluoroborates, pyrazolylborates, etc.), sulfonates, carboxylates (such as, e.g., formates, acetates, propionates, oxalates and citrates), substituted carboxylates (including halogenocarboxylates such as, e.g., trifluoroacetates, hydroxycarboxylates, aminocarboxylates, etc.) and salts and acids wherein the metal is part of an anion (such as, e.g., hexachloroplatinates, tetrachloroaurate, tungstates and the corresponding acids).

Further non-limiting examples of suitable metal compounds include alkoxides, complex compounds (e.g., complex salts) of metals such as, e.g., beta-diketonates (e.g., acetylacetonates), complexes with amines, N-heterocyclic compounds (e.g., pyrrole, aziridine, indole, piperidine, morpholine, pyridine, imidazole, piperazine, triazoles, and substituted derivatives thereof), aminoalcohols (e.g., ethanolamine, etc.), amino acids (e.g., glycine, etc.), amides (e.g., formamides, acetamides, etc.), and nitriles (e.g., acetonitrile, etc.). Non-limiting examples of preferred metal compounds include nitrates, formates, acetates, trifluoroacetates, propionates, oxalates and citrates, particularly nitrates and acetates.

Non-limiting examples of specific metal compounds include silver nitrate, silver nitrite, silver oxide, silver fluoride, silver hydrogen fluoride, silver carbonate, silver oxalate, silver azide, silver tetrafluoroborate, silver acetate, silver propionate, silver butanoate, silver ethylbutanoate, silver pivalate, silver cyclohexanebutanoate, silver ethylhexanoate, silver neodecanoate, silver decanoate, silver trifluoroacetate, silver pentafluoropropionate, silver heptafluorobutyrate, silver trichloroacetate, silver 6,6,7,7,8,8,8-heptafluoro-2,2-dimethyl-3,5-octanedionate, silver lactate, silver citrate, silver glycolate, silver glyconate, silver benzoate, silver salicylate, silver phenylacetate, silver nitrophenylacetate, silver dinitrophenylacetate, silver difluorophenylacetate, silver 2-fluoro-5-nitrobenzoate, silver acetylacetonate, silver hexafluoroacetylacetonate, silver trifluoroacetylacetonate, silver tosylate, silver triflate, silver trispyrazolylborate, silver tris(dimethylpyrazolyl)borate, silver ammine complexes, trialkylphosphine and triarylphosphine derivatives of silver carboxylates, silver beta-diketonates, silver beta-diketonate olefin complexes and silver cyclopentadienides; nickel oxide, nickel hydroxide, nickel chloride, nickel nitrate, nickel sulfate, nickel ammine complexes, nickel tetrafluoroborate, nickel oxalate, nickel isopropoxide, nickel methoxyethoxide, nickel acetylacetonate, nickel formate, nickel acetate, nickel octanoate, nickel ethylhexanoate, and nickel trifluoroacetate; platinum formate, platinum acetate, platinum propionate, platinum carbonate, platinum nitrate, platinum perchlorate, platinum benzoate, platinum neodecanoate, platinum oxalate, ammonium hexafluoroplatinate, ammonium tetrachloroplatinate, sodium hexafluoroplatinate, potassium hexafluoroplatinate, sodium tetrachloroplatinate, potassium hexabromoplatinate, hexachloroplatinic acid, hexabromoplatinic acid, dihydrogen hexahydroxoplatinate, diammine platinum chloride, tetraammine platinum chloride, tetraammine platinum hydroxide, tetraammine platinum tetrachloroplatinate, platinum(II) 2,4-pentanedionate, diplatinum trisdibenzylideneacetonate, platinum sulfate and platinum divinyltetramethyldisiloxane; gold(III) acetate, gold(III) chloride, tetrachloroauric acid, gold azide, gold isocyanide, gold acetoacetate, imidazole gold ethylhexanoate and gold hydroxide acetate isobutyrate; palladium acetate, palladium propionate, palladium ethylhexanoate, palladium neodecanoate, palladium trifluoroacetate, palladium oxalate, palladium nitrate, palladium chloride, tetraammine palladium hydroxide, tetraammine palladium nitrate and tetraammine palladium tetrachloropalladate; copper oxide, copper hydroxide, copper nitrate, copper sulfate, copper chloride, copper formate, copper acetate, copper neodecanoate, copper ethylhexanoate, copper methacrylate, copper trifluoroacetate, copper acetoacetate and copper hexafluoroacetylacetonate; cobalt oxide, cobalt hydroxide, cobalt chloride and cobalt sulfate; ruthenium(III) chloride, ruthenium(III) acetylacetonate, ruthenium(III) acetate, ruthenium carbonyl complexes, ruthenium perchlorate, and ruthenium amine complexes; rhodium(III) chloride, rhenium(II) chloride, tin(II) oxide, iron(II) acetate, sodium tungstate and tungstic acid.

The non-aqueous solvent may be a polyol. The suitable polyols may have any number of hydroxyl groups (but at least two) and carbon atoms. Also, the polyol may comprise heteroatoms (such as, e.g., O and N), not only in the form of hydroxyl groups, but also in the form of, e.g., ether, ester, amine and amide groups and the like (for example, it may be a polyester polyol, a polyether polyol, etc.). Preferably, the polyol comprises from about 2 to about 6 hydroxy groups (e.g., 2, 3 or 4 hydroxy groups). Also, the preferred polyol comprises from 2 to about 12 carbon atoms, e.g., up to about 3, 4, 5 or 6 carbon atoms. A particularly preferred group of polyols include the (alkylene) glycols, i.e., compounds which comprise two hydroxyl groups bound to adjacent (aliphatic or cycloaliphatic) carbon atoms. Usually these glycols will comprise up to about 6 carbon atoms, e.g., 2, 3 or 4 carbon atoms. Ethylene glycol, propylene glycol and the butylene glycols are non-limiting examples of preferred glycols.

The polyglycols constitute another group of preferred polyols include the glycols. Specific and preferred examples thereof are compounds which comprise up to about 6 alkylene glycol units, e.g., up to 4 alkylene glycol units such as, e.g., diethylene glycol, triethylene glycol, tetraethylene glycol, dipropylene glycol and tripropylene glycol.

Non-limiting examples of other specific compounds which may advantageously be used as the or a polyol include 1,2-propanediol, 1,3-butanediol, 1,4-butanediol, glycerol, trimethylolpropane, pentaerythritol, triethanolamine and trihydroxymethylaminomethane.

Of course, it also is possible to use other polyols than those mentioned above, either alone or in combination. For example, sugars and sugar alcohols can form at least a part of the polyol reactant. While polyols that are solid or semi-solid at room temperature may be employed, it is preferred that the employed polyol or at least the employed mixture of polyols is liquid at room temperature, although this is not mandatory. Further, it is also possible to use one or more other reducing agents in conjunction with the polyol(s), for example, in order to reduce the required reaction time and/or the reaction temperature. For instance, the substance that is capable of being adsorbed on the nanoparticles may exhibit a reducing effect with respect to the metal compound. A non-limiting example of such a substance is polyvinylpyrrolidone.

Figure 6:
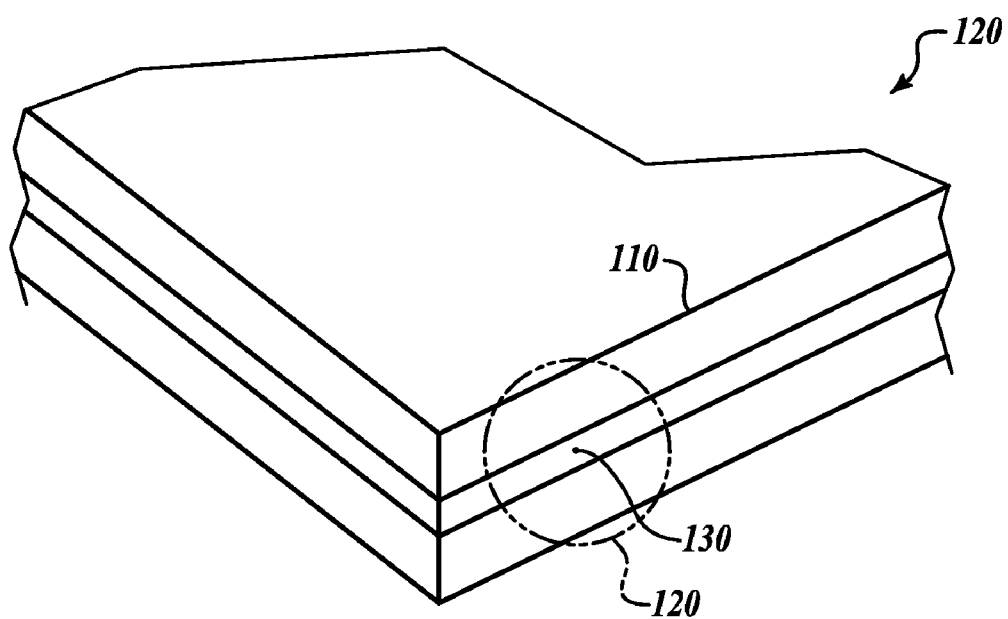
FIG. 6 is schematic perspective view, not to scale, of a portion of an exemplary embodiment of an adhered construct.
Figure 7:
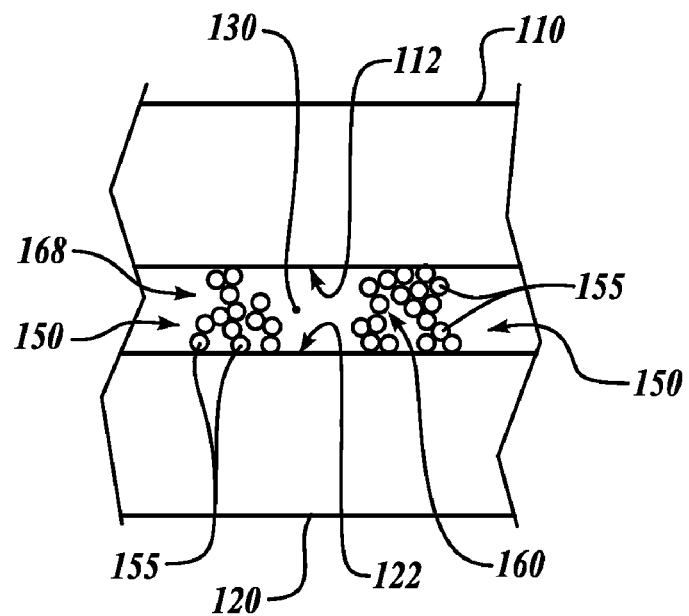
FIG. 7 is an enlarged view of a portion of the adhered construct of FIG. 6.

FIG. 6 illustrates an exemplary adhesive bonded construct 100 that has a first panel 110, which may an aircraft skin panel of aluminum alloy, bonded with an adhesive 130 to a second panel 120. FIG. 7 is a schematic representation to illustrate and explain a concept, and is not a representation of actual structure as may be seen under magnification. With this caveat, FIG. 7 illustrates that the surface 122 of second panel 120 is enhanced with a nanoparticulate precipitated coating 155 formed in nanoparticulate clusters 150 thereon. The nanoparticulate clusters 150 extend from surface 122, are bonded with adhesive 130, and contact surface 112 of first panel 110. Thus, the metallic nanoparticulate clusters 150 form an inter-panel bridge 160 through the adhesive matrix from first panel 110 to second panel 120. If the composition of the metallic nanoparticulate clusters 150 is selected for high heat transfer coefficient, then panel-to-panel heat transfer using multiples of such bridges 160 throughout the adhesive 130 is enhanced as compared to constructs that lack such metallic inter-panel bridges 160. Salts of copper, cobalt, nickel, silver, gold, platinum and the like conductive metals may be selected to provide heat conductive inter-panel bridges. Because of these bridges 160, any temperature differential that may ordinarily arise between bonded panels 110, 120 is reduced. A reduction in temperature differential reduces differential thermal expansion between the panels 110, 120 and the adhesive 130. This reduction in thermal differential expansion in turn reduces any potential for delamination.

Figure 8:
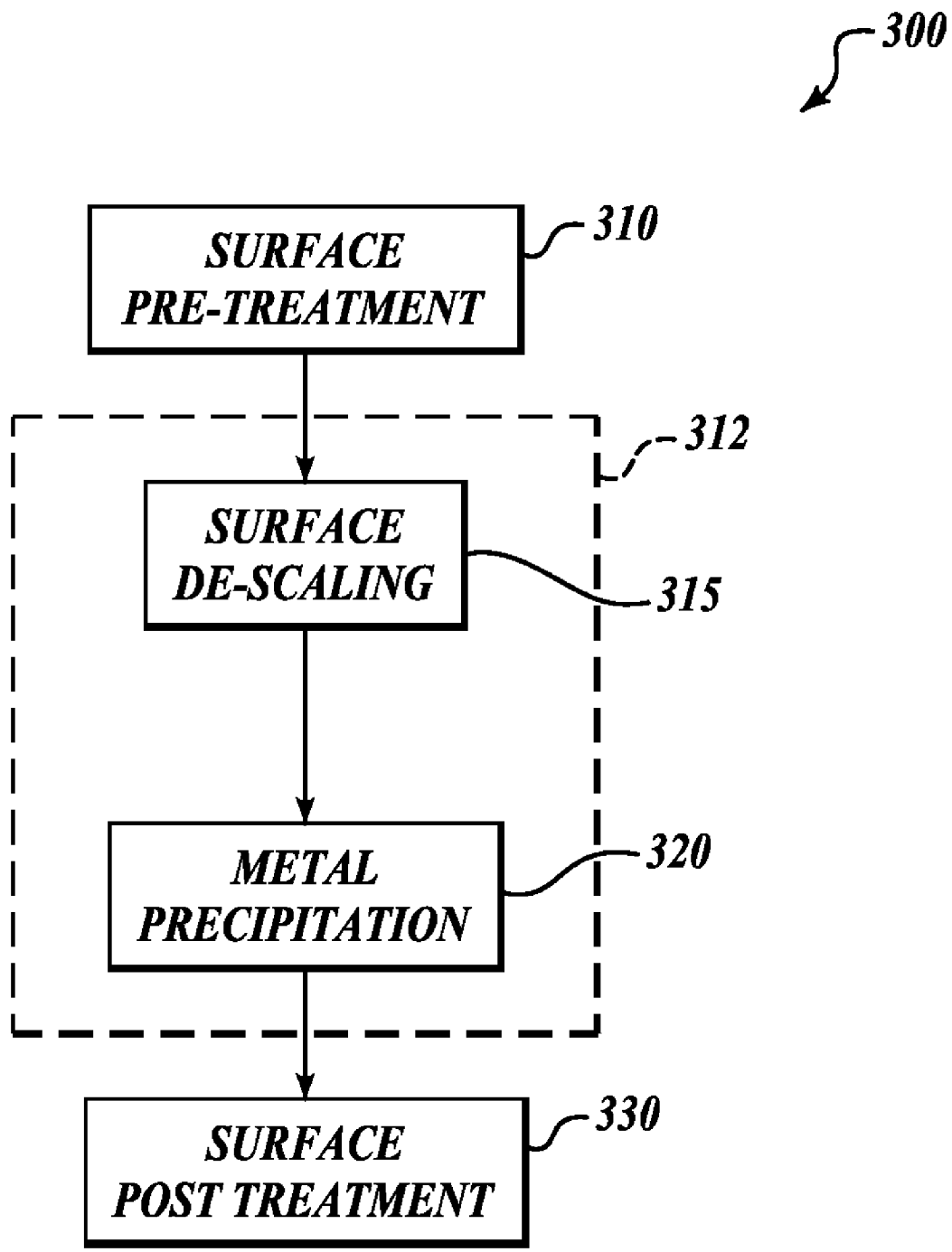
FIG. 8 is a process flow diagram in accordance with an exemplary embodiment.

FIG. 8 illustrates an exemplary embodiment of a process for enhancing a surface of an adherend 300. Other embodiments may use more or fewer process steps than illustrated. In general, a first process 310 includes adherend surface preparation. Surface preparation 310 may include several steps such as removing loose debris from surfaces, cleaning with soaps and/or detergents, sand or glass bead-blasting, degreasing, and the like.

The cleaned surface of the adherend is now ready for surface modification to add nanoparticulates in process 312. Process 312 includes adherend surface introduction or immersion in a solution for descaling in process 315 and nanoparticulate precipitation, in process 320, to produce a precipitated coating. De-scaling 315 removes any protective, relatively inert oxide scales that form under ordinary ambient conditions as a thin coating on certain metals and alloys, for example on aluminum and its alloys. De-scaling 315 occurs prior to metallic precipitation because sodium hydroxide is present. The adherend's surface may be masked to prevent nanoparticulate precipitation onto these masked areas. In process 320, the solution includes a solvent and at least one dissolved metal salt. The non-aqueous solvent may be a polyol such as 1,2-propanediol, ethylene glycol, propylene glycol, glycerol, other diols, and the like. The metal salt should be soluble in the solvent, and its metal ion should precipitate as a metallic nanoparticulate under process conditions. Typical salts (also listed above) include the metal acetates, chlorides nitrates phosphates, carbonates, sulfates, and the like. The metal ions may include cobalt, nickel, copper, silver, platinum, gold, and the like. A combination of salts may be used. For example, nickel acetate and cobalt acetate in 1,2-propanediol to produce a cobalt-nickel alloy precipitate.

In an exemplary method of forming CoNi alloy nanoparticulates on an adherend surface, 1.2 grams of cobalt (II) acetate tetrahydrate, 2.8 grams of nickel (II) acetate tetrahydrate, 0.1 grams of ruthenium (III) chloride and 0.8 grams of NaOH (about 0.1 M concentration) may be dissolved in 200 mL of 1,2-propandiol. The adherend surface may be introduced into the vessel containing the reaction precursors. The vessel may be sealed and evacuated, followed by argon gas addition. The mixture may then be heated to about 170° C. for about 20 minutes. Once reaction is complete, the mixture may be allowed to cool to room temperature. Once cooled, the nanoparticulate-precipitate-coated adherend may be removed from the reaction vessel and washed with ethanol (or other alcohol) to remove polyol solution and allowed to dry in air.

In some embodiments, addition of a seeding agent may facilitate precipitation of nanoparticulates. Ruthenium chloride is an example of such a seeding agent, although other seeding agents and techniques, such as ultra-sound, may also be used.

The size and shape of the nanoparticulate precipitate may be tailored by selection and control of process variables such as sodium hydroxide concentration.

After precipitation of the nanoparticulates, the precipitate-coated adherend surface may undergo post treatment processes 330, such as draining of solvent from the enhanced surface, washing with de-ionized water, and drying in air or inert gas. To prevent re-scaling up of any exposed surfaces prone to oxidation, the nanoparticulate precipitate-coated adherend may be stored under an inert atmosphere until ready for bonding to create a construct, such as that shown in FIG. 6, for example.

During adhesive application to the nanoparticulate precipitate-coated surface, the adhesive flows into inter-cluster spaces and may coat at least some of the nanoparticulates. When this adhesive sets, it provides some physical support for clusters of nanoparticulates that may be more fragile and preserves the structure of the network of clusters, especially the clusters that extend upward from the surface of the adherend. These upward extending clusters are the basis for bridges 160 from the adherend 120 to the substrate 110 that will be adhered to it, as shown schematically in FIG. 7.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A metallic substrate comprising a precipitate-coated surface, the precipitate-coated surface comprising: a precipitate, the precipitate comprising nanoparticulates, a first portion of the nanoparticulates adheres to a surface of the metallic substrate and a second portion of the nanoparticulates is in contact with the first portion of nanoparticulates;

wherein the metallic substrate comprises aluminum or an aluminum alloy; and wherein the precipitate comprises clusters of cobalt-nickel nanoparticulates, the cobalt-nickel nano particulates in a size range from about 50 nm to about 1000 nm.

2. The metallic substrate of claim 1, wherein the precipitate comprises a cobalt-nickel alloy and the nanoparticulates comprise starburst shapes.

3. The metallic substrate of claim 1, wherein the second portion of the precipitate comprises clusters of nanoparticulates, the clusters of nanoparticulates forming networks of clusters.

4. The metallic substrate of claim 3, wherein some of the networks of clusters comprises inter-cluster spaces configured and sized so that when an adhesive composition is applied to the precipitate-coated surface, the inter-cluster spaces receive the adhesive composition and clusters bond to the adhesive composition and are supported by the adhesive composition, when the adhesive composition sets.

5. The metallic substrate of claim 3, wherein some of the clusters extend upward from the precipitate-coated surface so that when an adhesive composition is applied and a second substrate is bonded to the metallic substrate, at least some of the upward-extending clusters bond to the adhesive and contact the second substrate.

6. The metallic substrate of claim 1, wherein the metallic substrate comprises aluminum or an aluminum alloy, the precipitate-coated surface is free of aluminum oxide scale and wherein the precipitate comprises clusters of starburst-shaped cobalt-nickel nanoparticulates, the starburst-shaped cobalt-nickel nano particulates in a size range from about 50 nm to about 1000 nm.

7. An adhered construct comprising;
- a first substrate having a first surface, the first surface comprising a precipitated coating comprising a metallic precipitate, the metallic precipitate comprising nanoparticulates, a first portion of the nanoparticulates adhering to the first surface and a second portion of the nanoparticulates contacting the first portion of the nanoparticulates;

wherein the metallic substrate comprises aluminum or an aluminum alloy; and wherein the precipitate comprises clusters of cobalt-nickel nanoparticulates, the cobalt-nickel nano particulates in a size range from about 50 nm to about 1000 nm;

a second substrate having a second surface; and an adhesive applied between the first surface and the second surface.

8. The construct of claim 7, wherein the adhesive comprises an epoxy resin.

9. The construct of claim 7, wherein the precipitated coating comprises clusters of nanoparticulates and at least some of the clusters extend through the adhesive applied between the first substrate and the second substrate to provide a metallic bridge for transfer of thermal energy by conductivity through the construct.

\* \* \* \* \*